United States Patent
Ridolfo et al.

(10) Patent No.: US 7,088,255 B2
(45) Date of Patent: Aug. 8, 2006

(54) HEALTH MONITORING DISPLAY SYSTEM FOR A COMPLEX PLANT

(75) Inventors: Charles F. Ridolfo, Bloomfield, CT (US); Daryl L. Harmon, Enfield, CT (US); Dreyfuss Colin, Enfield, CT (US)

(73) Assignee: Westinghouse Electric Co, LLC, Pittsburgh, PA (US)

( * ) Notice: Subject to any disclaimer, the term of this patent is extended or adjusted under 35 U.S.C. 154(b) by 238 days.

(21) Appl. No.: 10/157,280

(22) Filed: May 29, 2002

(65) Prior Publication Data

US 2003/0005486 A1 Jan. 2, 2003

Related U.S. Application Data

(60) Provisional application No. 60/294,130, filed on May 29, 2001.

(51) Int. Cl.
G08B 17/00 (2006.01)

(52) U.S. Cl. ............... 340/635; 340/506; 340/507; 702/29; 702/181

(58) Field of Classification Search ........... 340/635, 340/500, 501, 506, 507; 703/2; 702/181, 702/29

See application file for complete search history.

(56) References Cited

U.S. PATENT DOCUMENTS

| | | |
|---|---|---|
| 5,127,005 A | 6/1992 | Oda et al. |
| 5,132,920 A | 7/1992 | Bellows et al. |
| 5,227,121 A | 7/1993 | Scarola et al. |
| 5,311,562 A | 5/1994 | Palusamy et al. |
| 5,331,579 A * | 7/1994 | Maguire et al. ............. 703/2 |
| 5,347,553 A | 9/1994 | Scarola et al. |
| 5,361,198 A | 11/1994 | Harmon et al. |
| 5,394,447 A * | 2/1995 | Scarola et al. .............. 376/259 |
| 5,715,178 A | 2/1998 | Scarola et al. |
| 5,817,958 A * | 10/1998 | Uchida et al. ............ 73/865.9 |
| 5,859,885 A | 1/1999 | Rusnica et al. |
| 6,006,171 A | 12/1999 | Vines et al. |
| 2002/0169514 A1 * | 11/2002 | Eryurek et al. ............. 700/110 |

FOREIGN PATENT DOCUMENTS

| | | |
|---|---|---|
| EP | 0 448 044 A | 9/1991 |
| EP | 0 612 039 A2 | 8/1994 |
| EP | 0 626 697 A1 | 11/1994 |

OTHER PUBLICATIONS

Harmon, Daryl et al., "Wising up to get Smart", Nuclear Engineering International, pp. 32-33, May 2001.

Harmon, Daryl et al., "Developing 'Smart' Equipment and Systems Through Collaborative Neri Research and Development", Presented at 15th Korean Atomic Industrial Forum, Apr. 2000, 10 pp.

(Continued)

Primary Examiner—Julie Bichngoc Lieu

(57) ABSTRACT

A single page enterprise wide level display provides a comprehensive readily understood representation of the overall health status of a complex plant. Color coded failure domains allow rapid intuitive recognition of component failure status. A three-tier hierarchy of displays provide details on the health status of the components and systems displayed on the enterprise wide level display in a manner that supports a logical drill down to the health status of sub-components on Tier 1 to expected faults of the sub-components on Tier 2 to specific information relative to expected sub-component failures on Tier 3.

24 Claims, 13 Drawing Sheets

OTHER PUBLICATIONS

Harmon, Daryl et al., "Developing 'Smart' Equipment and Systems Through Collaborative Neri Research and Developmen: A First Year of Progress", Presented at 12th Pacific Basin Conference, Oct. 2000, 12 pp.

* cited by examiner

19e

HEALTH MONITORING SYSTEM
FILE  HELP

DRILL DOWN DATA (BEARINGS)

| STATE PROBABILITY | MIMIC DISPLAY | SENSOR DATA | HISTORICAL DATA | MAINTENANCE LOG | COST FUNCTION |

CHARGING PUMP 1A
MAINTENANCE LOG

| DATE | PERFORMED BY: | ASSEMBLY EXAMINED | CONDITION | MAINTENANCE ACTION TAKEN |
|---|---|---|---|---|
| 09/06/01 | DLH | UPPER GUIDE BEARINGS | NORMAL | ROUTINE PM PER PROCEDURE UGB.20.c |
| 09/23/01 | DLH | LOWER GUIDE BEARINGS | NORMAL | ROUTINE PM PER PROCEDURE LGB.20.c |
| 09/30/01 | DLH | OIL COOLER | EXCESSIVE LEAK AT COOLER EXIT TUBING | (1) REPLACED COOLER EXIT TUBING (2) REWORKED EXIT COOLER JOINT PER PROCEDURE RPOC.102 |

*FIG.11*

HEALTH MONITORING DISPLAY SYSTEM FOR A COMPLEX PLANT

CROSS REFERENCE TO RELATED APPLICATION

This application claims priority from Provisional Patent Application No. 60/294,130, filed May 29, 2001.

BACKGROUND OF THE INVENTION

1. Field of the Invention

This invention relates to a system for displaying health monitoring information for a complex plant in an organized easily understand manner, including a single enterprise level health condition display supplemented with multiple tiers of detail information.

2. Background Information

Many industries, such as the power generation industry, are utilizing health-monitoring technology to improve the long term availability and reliability of plant components. With this technology it is possible to obtain relatively reliable predictions of subsequent equipment and system failures. This allows corrective or compensating actions to be implemented prior to the actual failure of equipment or systems, thus minimizing the operability and economic consequences of such failures.

A key to effective utilization of the predictive failure information as determined by a health monitoring system is to adequately present such information to the operations staff in a convenient and readily understandable manner. This is especially critical at the enterprise level in which the sum total of plant-wide health information must be logically presented to the operations staff for evaluation.

Currently, health monitoring information is presented in a fragmented manner. There is a need to better organize and present the health monitoring results on a global level, and to simplify the interpretation of such information so the user is presented with concise information on the potential of future system and component failures, in a manner that supports his operational tasks.

SUMMARY OF INVENTION

This need and others are satisfied by the invention which is directed to a health monitoring display system for a complex plant that includes sensors generating sensed values of specified parameters in the complex plant, a health monitoring system that determines from the sensed value a health condition for a plurality of portions of the complex plant, and a human machine interface incorporating a display device presenting in a single enterprise level display page the health condition of each of selected of the portions of the complex plant chosen to provide an indication of enterprise-wide health of the plant.

The display device includes means for displaying multiple tiers of information relevant to the health of a selected portion of the complex plant selected through the operator input device. The multiple tiers of displays are selected starting with the single enterprise level or apex display. The display device includes means for displaying information on the possible failure of sub-components of the selected portion of the complex plant in a first tier display. These pages of the first tier display include a predicted time to failure for each of the sub-components and may be sequentially arranged according to such predicted time to failure. In the exemplary system an expected time to failure, an upper bound of the predicted time to failure and a lower bound of the predicted time to failure are presented for each sub-component. The display page can also include the expected down time for each sub-component and may include the time to scheduled outage for comparison.

The second tier presents pages each displaying the faults for a failure mode selected from the first tier display. The faults are displayed in a hierarchy and can include a failure state probability for each fault.

A third tier includes multiple display pages each with different details on the selected failure mode. The details presented in these pages can include a state probability of the selected failure mode, a mimic display, historical data, a maintenance log, cost functions, and feature/sensor data. The state probability can be presented as a probability of a normal state, an intermediate state, and a severe state. The historical data can be represented graphically, for instance, sensor values recorded over a period of time can be displayed. Cost functions displayed can include a representation of the cost of the failure to be expected from the selected failure mode. For instance, a graphical representation of the cost to be expected as a function of the time that the repair is made can be presented. Also, the cost of operating the complex plant as a function of time over an extended period can also be presented.

A common hierarchy of failure domains, such as an imminent probability of failure, a low probability of failure and an intermediate probability of failure are used throughout to promote rapid intuitive recognition of impaired health.

BRIEF DESCRIPTION OF THE DRAWINGS

A full understanding of the invention can be gained from the following description of the preferred embodiments when read in conjunction with the accompanying drawings in which:

FIG. 11 is an illustration of an example of a third tier maintenance log display page.

DESCRIPTION OF THE PREFERRED EMBODIMENTS

Figure 1:
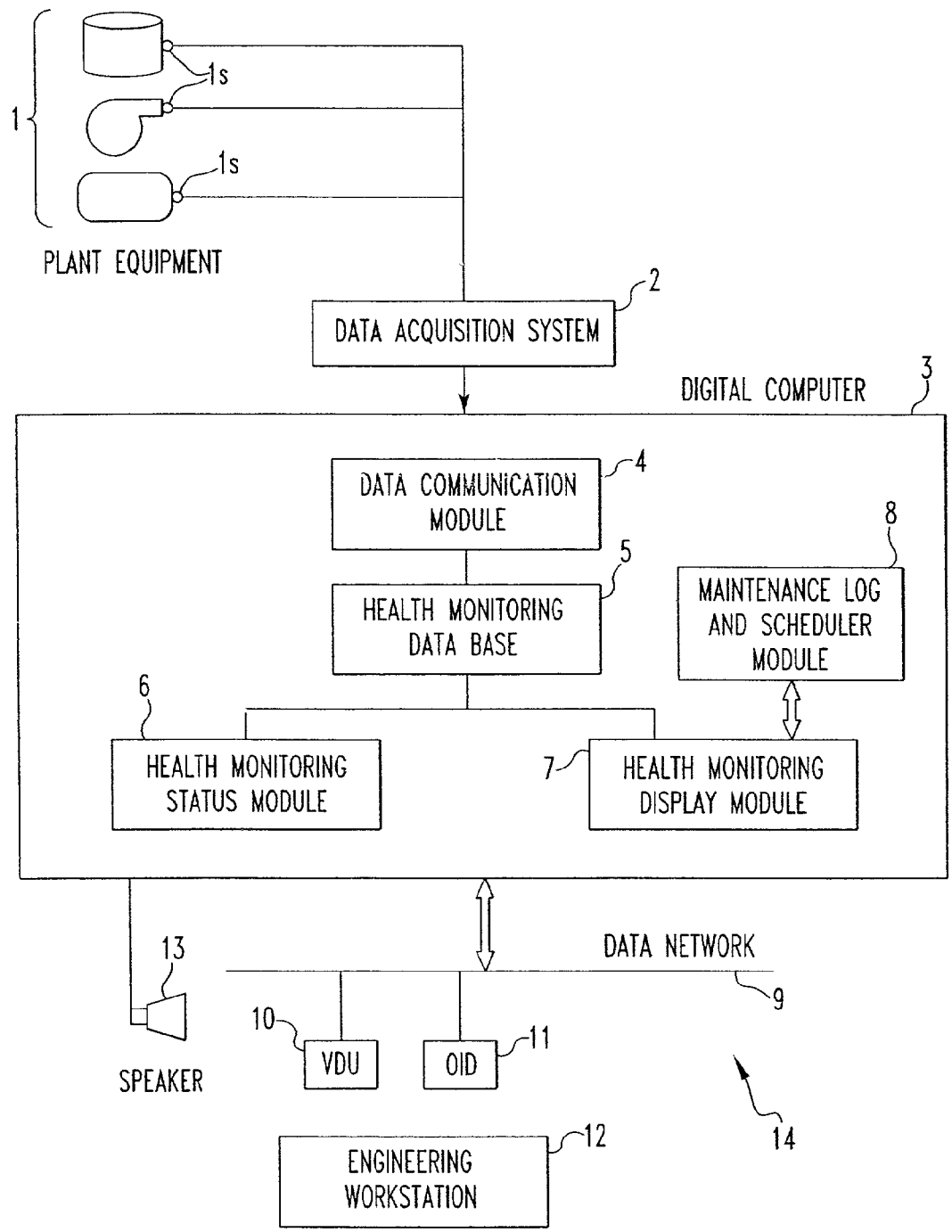
FIG. 1 is a schematic diagram of the health monitoring display system of the invention.

FIG. 1 provides a diagrammatic illustration of the Health Monitoring Display System. Sensors 1, located on plant equipment, record plant and plant process parameters (such as temperatures, flow rates, pressures, radiation levels, valve positions, pump rotation speeds, vibration levels, acoustic signatures, etc.). These sensors are interfaced to a Data Acquisition System 2 that transmits the acquired sensor data to a digital computer 3.

Video Display Units (VDU) 10, located at Engineering Workstations 12, are used to present predictive maintenance information to the operators and maintenance personnel. Operator Input Devices (OID) 11 are also located at each Engineering Workstation 10 and allow the plant staff to interface with the digital computer as further discussed below. The OID may be a trackball, computer mouse, VDU touch-screen, finger pad, keyboard, keypad, and the like. An audio output device 13, is used to provide annunciation whenever equipment or systems are predicted to have an imminent failure potential.

There are five major components of the Predictive Maintenance Display system which are contained within the Digital Computer 3:
Data Communications Module 4
Health Monitoring Data Base 5
Health Monitoring Status Module 6
Health Monitoring Display Module 7
Maintenance Log and Scheduler Module 8

These components interface with Video Display Units (VDUs) 10 and Operator Interface Devices 11 located at the Engineering Workstations 12 via a Data Network 9, and via the audio output device 13 to provide a human machine interface 14.

Data Communications Module

The data communications module interfaces the Digital Computer 3, with the Data Acquisition System 2. This module transfers plant equipment data, as acquired by the Data Acquisition System 2, from the Data Acquisition System 2 to the Health Monitoring Data Base 5, where the plant data is subsequently accessed by the Health Monitoring Status Module 6.

Health Monitoring Data Base

The Health Monitoring Data Base 5, stores plant equipment data, acquired by the Data Acquisition System 2, for subsequent access by both the Health Monitoring Status Module 6, and the Health Monitoring Display Module 7. The Health Monitoring Data Base 5, also stores failure predictions and equipment health state information, as determined by the Health Monitoring Status Module 6, for subsequent access by the Health Monitoring Display Module 7.

Health Monitoring Status Module

The Health Monitoring Status Module 6, within the Digital Computer 3, determines if any equipment is in imminent danger of failing and determines the predicted remaining equipment life until the equipment must be repaired, refurbished, or replaced.

To perform its incipient failure detection function, the Health Monitoring Status Module 6 periodically and/or continuously (as appropriate) performs the necessary algorithmic processing on the requisite component and/or process measurements obtained from the Data Acquisition System 2.

Due to the wide variety of equipment and plant processes that exist within a plant, a variety of techniques are necessarily utilized to ascertain the potential of incipient equipment failures and to predict the equipment remaining life.

The following are typical of the methodologies that are utilized by the Health Monitoring Status Module 6 to ascertain the potential of incipient equipment failures and to predict the equipment remaining life.

Trend Analysis

Trend analysis is used to assess equipment health and degradation by monitoring for changes in selected measurement parameters over time. The trended information may be in either the time domain (such as absolute vibration level tracked against time) or in the frequency domain (such as vibration amplitude over a frequency spectrum which is monitored—in this case significant increases/changes in amplitude at various frequencies are tracked in time).

To perform trend analysis, parameters to be trended are first identified, and trend periodicity to be utilized is then defined, and alert/warning criteria for early identification of impending problems are finally developed. Typically, the equipment manufacturers' recommendations and industry experience are used to develop alert/alarm criteria. Statistical methods are utilized to enhance the trend accuracy.

Pattern Recognition

Pattern Recognition techniques are utilized to assess equipment health and degradation by analyzing the selected measurement parameters relative to state or status patterns. Statistical methods are used to improve pattern recognition accuracy. Techniques such as Time Source Analysis and Fast Fourier Transform are typically used to process the data in conjunction with pattern recognition algorithms.

Correlation Techniques

Related sets of data may be correlated to assist in performing predictive analysis. Correlation coefficients are developed to aid in the recognition of patterns or the recognition of sequences of events that are related.

Limits and Ranges

Component monitoring may be utilized using alarm/alert limits using thresholds, bands and frequency filters. This approach allows subsequently gathered information to be compared to expected regions of operation for the monitored components.

Data Comparison

Several comparative methods may be utilized for preventative maintenance data analyses. Data for a particular system or component can be compared to standard values, manufacturers' recommendations, technical specifications, code limits, or normal baseline data or ranges. Data may be compared on an absolute basis or a relative basis.

As an example, data from a specific component may be analyzed to identify discontinuities (breaks) in a performance curve, or data trends, or data offsets. In addition, data on similar components can be compared to develop comparison data relative to similar components. This comparison of data is used to evaluate equipment or system health and aging.

Statistical Process Analysis

Statistical methods are used extensively in the analysis of plant data for predicting component health. Techniques, such as curve fitting, data smoothing, predictive techniques and probabilistic inference techniques (such as Bayesian Belief Networks—BBN's), and mean standard deviation are extensively being used.

The predictive maintenance algorithms utilized by the Health Monitoring Status Module 6 will employ a variety of the aforementioned techniques, depending on the equipment or system that is being analyzed. The following describes a number of the predictive analysis applications that are employed by the Health Monitoring Status Module 6 to predict remaining equipment life. The exemplary complex plant to which the Health Monitoring Display System is applied is a nuclear power plant. However, it will be apparent that the invention has application to other types of complex plants.

Vibration Analysis

Vibration analysis is utilized to determine the health and useful remaining service life of critical equipment and components in the Nuclear Island (NI) as well as for suitable Balance-of-Plant (BOP) components. Vibration detectors transmit vibration information associated with steady state operation and other operating regimes, such as equipment start-up, coast-down and breakaway analyses can be used to enhance the capabilities of the predictive program to detect incipient failures. The remaining equipment life is inferred from vibration frequency analysis by trending amplitude changes in the spectrum over time.

Equipment transient analysis techniques (for start-up, coast-down and breakaway conditions) include vibration spectral data as a function of machine speed. These analyses are utilized to determine the presence of equipment structural response frequencies as they are excited during the equipment transients (such as start-up and coast-down). Trending, comparative analysis and signature frequency analysis techniques are utilized to detect indications of component degradation and to predict remaining component useful life.

Temperature Measurement

Indications of incipient mechanical and electrical problems can often be determined by the presence of excessive heat generation or by the absence of suitable heat output. Temperature measurement technologies, such as contact pyrometry and thermography, are used to by Health Monitoring Status Module 6 to support predictive maintenance applications. Measurements obtained via infrared thermography and contact pyrometry are used to determine the remaining life of electrical switch gear, motor control centers, and transformer. The remaining life of electrical connections, insulation, and of equipment that is experiencing friction induced heating is also inferred by monitoring heat generation.

Flow Measurement of Liquids

For certain equipment and systems, flow changes are an indicator of impending component failure and of remaining equipment life. Existing process monitoring instrumentation can usually be utilized for the requisite data measurements. Flow measurement is typically collected for trending, and for correlation predictive analysis.

Valve Analysis

The Health Monitoring Status Module 6 module predicts potential failures, degradations and remaining life for valve by analysis of valve and switch timing, number of operational cycles, and trending in-service valve test results.

Valve operator types will include air, motor, hydraulic and solenoid.

Electrical Analysis

Electrical measurement analysis is used to determine the health and to predict the remaining useful service life for electrical motors, breakers, switches, cables, transformers, controllers, and cables. The following types of analysis techniques are applied to such equipment as appropriate: motor current signature analysis, contact resistance measurements, breaker closing time, voltage drop, and circuit ground resistance.

Infrared thermography capability is also used to collect heat generation data, which can provide additional indications of impending equipment failure or reduction in service life. In addition, ultrasonic monitoring is also used for detection of Corona discharge activity in transformers.

Methodologies utilized for early detection of electrical component degradation include trending, comparative analysis, and signature frequency analysis.

Thickness Measurement Analysis

For certain plant equipment and components (such as associated piping), thickness measurement is used to provide an indication of equipment integrity and its remaining useful service life. Thickness measurement sensors (such as ultrasonic sensors) are utilized to determine the degree of wear, erosion, and corrosion that has occurred and to predict the remaining useful life of the equipment.

Trending and correlation analysis techniques are typically used for analysis and predictive purposes.

Efficiency Analysis

The calculation and tracking of equipment efficiency is used for indications of degrading performance and impending failures. Operational efficiency are determined for appropriate equipment, components, and systems utilizing suitable measurements.

Trending and correlation analysis is applied to note changes in operational efficiency and predict when operation no longer becomes cost-effective or when equipment replacement is advisable.

Examples of efficiency analysis include determining the efficiency for heat transfer processes for applicable equipment and systems. Changes in efficiency serve as an indicative of equipment degradation, fouling, or subsystem failures.

Analysis of Position and Alignment

For some equipment and components, position/alignment measurement serves as an indicator of equipment integrity and an indication of remaining useful service life. Position/alignment measurements from plant sensors are used to determine the degree of misalignment and to track the change in misalignment over time.

Trending and correlation analysis techniques have been proposed for analysis and predictive purposes.

Predictions of incipient equipment failures, as determined by the Health Monitoring Status Module 6 are stored in the Health Monitoring Data Base 5 for subsequent access and display by the Health Monitoring Display Module 7.

Health Monitoring Display Module

The Health Monitoring Display Module 7 within the Digital Computer 3 collects and displays the equipment and system failure predictions as determined by the Health Monitoring Status Module 6, collects and displays plant equipment sensor data as acquired by the Data Acquisition System 2, and collects and displays maintenance log and schedule information as provided by the Maintenance and Log Scheduler Module 8.

Figure 2:
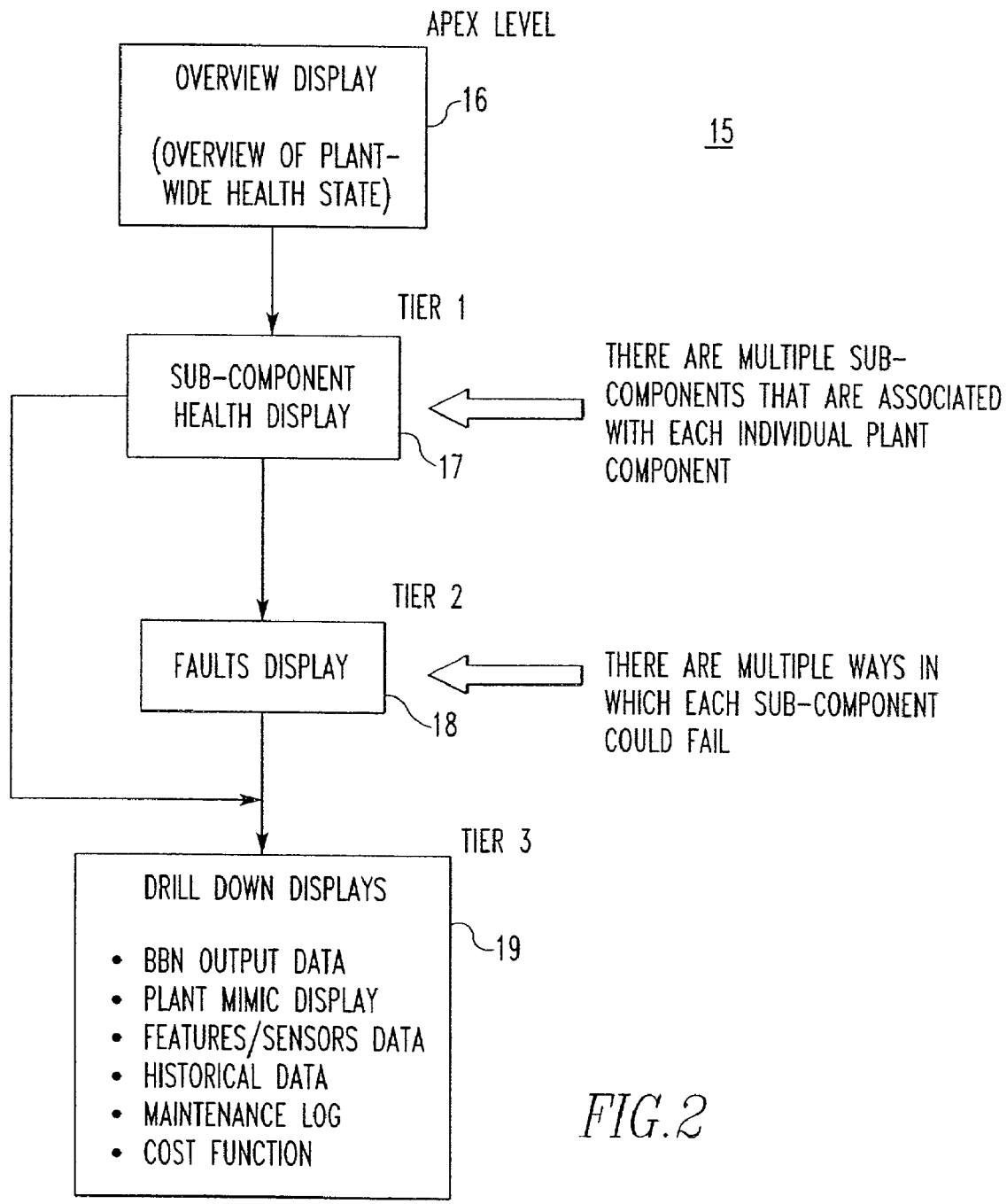
FIG. 2 is a diagram illustrating the hierarchy of displays generated by the system.

The information collected by the Health Monitoring Display Module 7, is presented in a multi-level display hierarchy 15 illustrated in FIG. 2. This hierarchy includes:

Apex level 16—A single overall health status page that allows the enterprise-level health status to be quickly ascertained, in an unambiguous manner from a single display page, via use of color-coded "failure domains".

Tier one 17—A series of display pages that provide specific details on the health state of the sub-components that are associated with each plant component, plant system, or specific piece of plant equipment, i.e., with each portion of the plant included in the Apex display. A separate Tier one display is provided for each plant component, plant system, or specific piece of plant equipment. The display indicates the health state of the associated sub-components.

Tier two 18—A series of display pages that provide specific details on the faults (types of failures) that are associated with each plant sub-component.

Tier three 19—A series of detailed information display pages that are used for analysis, diagnostics and repair planning purposes.

Figure 3:
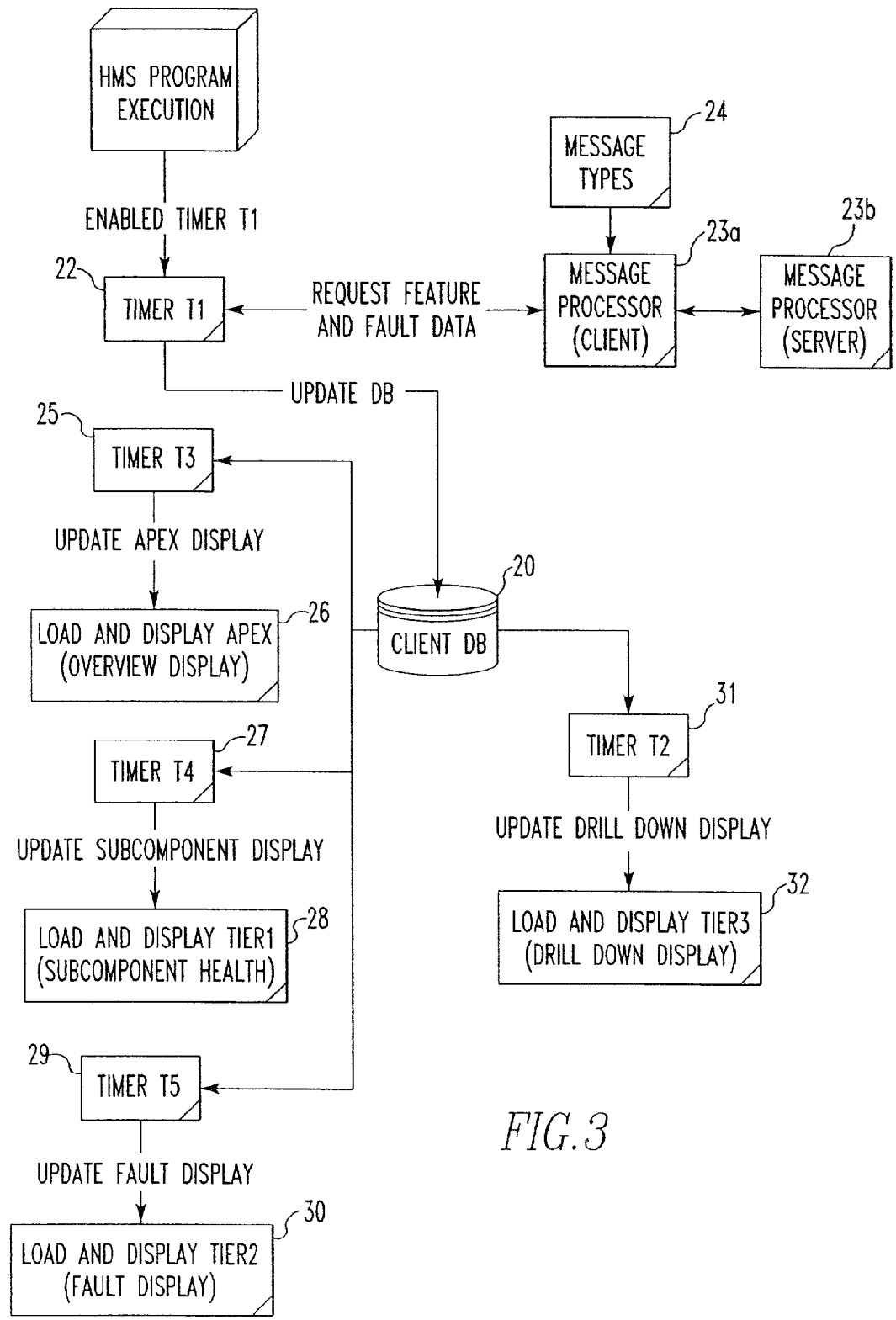
FIG. 3 is a schematic diagram of the structure of the program employed by the system to generate the various display pages.

FIG. 3 illustrates a typical software structure for the Health Monitoring Display Module 7.

The Health Monitoring Display Module 7 client application utilizes a local database, Client DB 20, for application processing. The application is comprised of the following internal program modules:

Accessing the HMI application program (initial program start-up and execution) automatically enables timer T1 22. This initiates the processing of message requests to the Health Monitoring Data Base 5, using the Message Processor modules 23a and 23b, to periodically obtain sub-component and fault data and to update the local database 20. Communication messages are pre-coded and stored in the Message Types module 24. As a result, the latest sub-component and fault data, as determined by the Health Monitoring Status Module 6 and stored in the Health Monitoring Data Base 5, are made available to the local database 20.

Whenever the Apex display is accessed (requested to be displayed) on the VDU 10, timer T3 25 is activated. Once the timer is activated, it will periodically retrieve the latest component health data from the local database 20 and update the Apex display screen. Software module 26 loads and displays the Apex screen on the VDU 10.

Whenever a plant component on the Apex display is designated on the VDU 10 using the OID 11, timer T4 27 is activated. Once the timer is activated, it will periodically retrieve the latest health data for the sub-components that are associated with the selected plant component from the local database 20 and update the associated Tier-1 display screen. Software module 28 loads and displays the Tier 1 screen (Sub-component Health) on the VDU 10.

Whenever a sub-component on a Tier 1 display is designated on the VDU 10 using the OID 11, timer T5 29 is activated. Once the timer is activated, it will periodically retrieve the latest fault data for he selected sub-component from the local database 20 and update the associated Tier 2 display screen. Software module 30 loads and displays the Tier-2 screen (Faults) on the VDU 10.

Whenever a plant fault on a Tier-2 display is designated on the VDU 10 using the OID 11, or whenever a "drill down" menu selection is made via the VDU 10 using the OID 11, timer T2 31 is activated. Once the timer is activated, it will periodically retrieve the latest "drill down data" from the local database 20 and update the associated Tier-3 display screen. Software module 32 loads and displays the appropriate Tier-2 screen ("Drill Down" data) on the VDU 10.

Maintenance Log and Scheduler Module

Returning to FIG. 1, the Maintenance Log and Scheduler Module 8 within the Digital Computer 3 contains computerized plant maintenance records, schedules of future maintenance periods, and a cost function calculator that computes the dollar cost associated with the scheduling of the repair activity. The information provided by this module is displayed as a lower level "drill-down" display and is used to provide supporting information to assist the operations staff in planning repair or replacement strategies for a component that is predicted to fail.

Display Set for the Enterprise-Level Health Monitoring System

As described above in connection with FIG. 2, the information collected by the Health Monitoring Display Module 7, is presented in multi-tier display hierarchy that includes: an apex level, tier one level, tier two level and tier three level.

The display set is designed to provide unambiguous health status information to the user, in a manner that is intuitive, as explained below. Simple and rapid display access mechanisms are utilized to maneuver through the display hierarchy.

Figure 4:
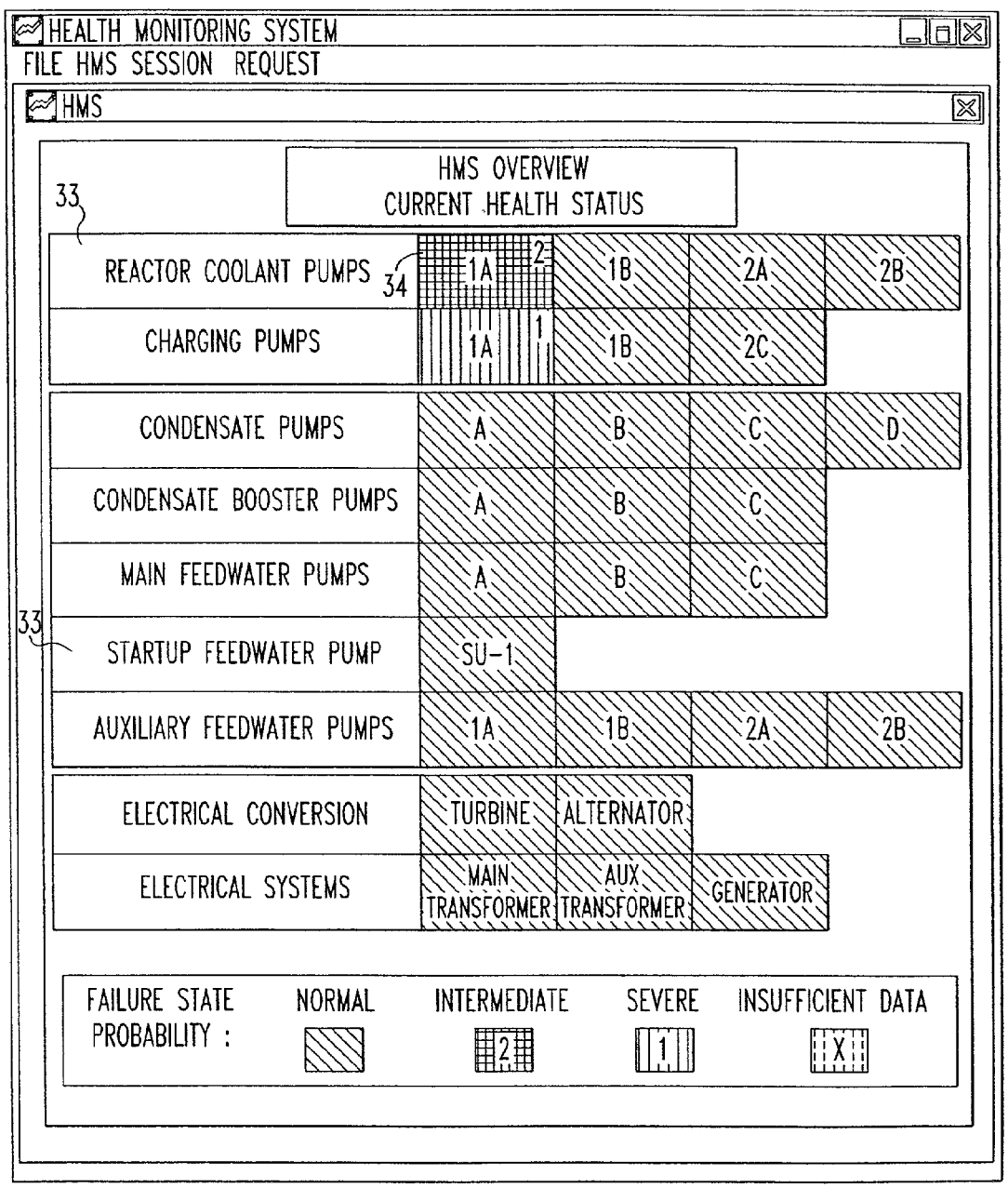
FIG. 4 is an illustration of the single page enterprise level display generated by the invention.

FIG. 4 illustrates the interactive display 16 for the Apex-level overall (plant-wide) health status page. This page presents the overall plant-wide health state within a single display page. Its displays the health of portions of the plant chosen to provide an indication of enterprise-wide health of the complex plant. Each plant component or system 33 that is being monitored for health status is indicated on the display by a uniquely identified box. The corresponding health status 34 for each component is designated on the display via color-coding of its corresponding box and by use of a numeric designator that is placed within a corner of the box.

The health status of each component or system is presented by indicating its membership within one of several pre-defined failure domains. For illustrative purposes, the following table illustrates a 3-class failure domain.

TABLE 1

Failure Domains

Coding Convention

| Color | Designator | Failure Domain | Comment |
| --- | --- | --- | --- |
| Purple | X | Insufficient data to predict the health state. | There is insufficient data available and no health status prediction can be made |
| Green | — | Normal = Low probability of a failure occurring. | There is only a low probability that a failure will occur |
| Yellow | 2 | Intermediate = Intermediate probability of a failure occurring. | A failure is predicted to occur at some period in the future. |
| Red | 1 | Severe = High probability of a failure occurring. | An imminent failure is predicted to occur. |

Note:
The alphanumeric designators are used to supplement the color coding and provide alternate cueing to individuals with poor color discrimination ability. No alphanumeric designator is utilized for a low probability of failure condition.

The use of failure domains allows rapid and intuitive recognition of the failure status by the user. For instance, in the example of FIG. 4, Charging Pump 1A is indicated as being in the severe domain, Reactor Coolant Pump 1A is in the intermediate domain and the remainder of the components and systems are in the normal domain.

The display is based on a "Green Board" concept, such that when all component boxes are displayed in green there is no equipment that has a significant probability of failure. Any equipment that is displayed with other than a green color has a significant probability of a failure occurring. The failure could be imminent (red color, and numerical indicator=1) or expected at some intermediate time interval (yellow color, and numerical indicator=2). Thus, the overall health status of plant equipment is readily ascertained from just visual inspection of the Apex display.

The display is interactive in that any of the component boxes may be selected and interrogated to determine what are the prevailing failure modes. This is accomplished by simply designating the component (box) of interest by selecting it via the Operator Input Device (OID) 11 and activating the selection. For example, using a mouse as the OID 11, the user would first maneuver the mouse to place the cursor on the desired component (box) and would activate the selection using a "mouse click" button.

Figure 5:
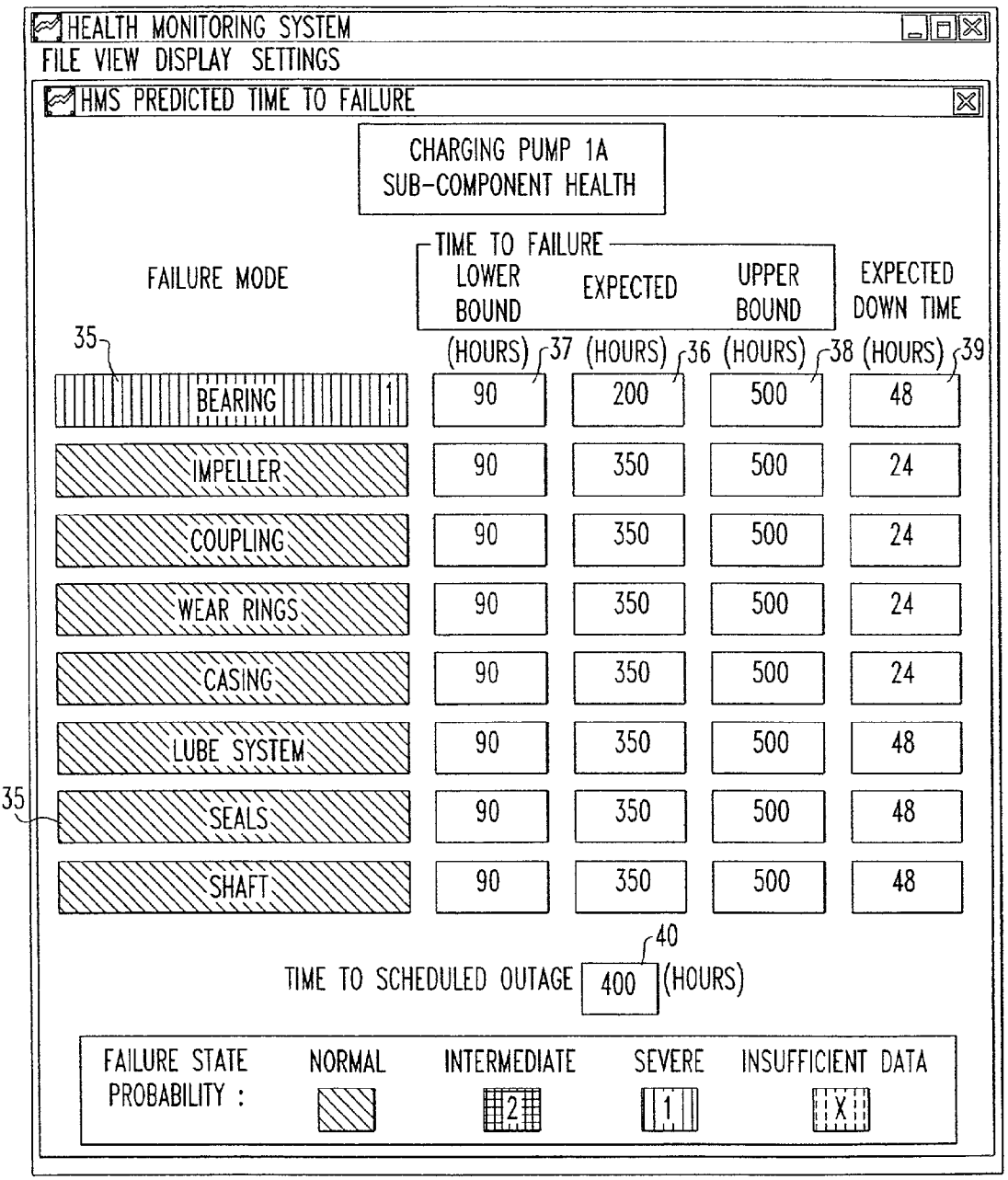
FIG. 5 is an illustration of an example of a first tier display page illustrating the presentation of a failure mode.

FIG. 5 illustrates a typical interactive display for the Tier-1 sub-component health page 17. This display indicates the health status of all the sub-components 35, that comprise a single plant component, plant system, or a specific piece of plant equipment 33. If the Health Monitoring Status Module 6 detects multiple sub-components 35 that are predicted to cause subsequent failures, then each of these sub-components is depicted and displayed. The sub-components are arranged on the display page in the expected time sequence order that they are predicted to fail (see FIG. 5). The Tier 1 display 17 utilizes the same color coding as the Apex (plant-wide) health status page 16 for consistency and to provide additional visual clueing to the user.

The display indicates the expected time to failure 36 for each sub-component including the lower 37 and upper 38 time bounds (as determined by the Health Monitoring Status Module 6), the expected "down time" 39 for each indicated sub-component, and an indication 40 of the time remaining until the next scheduled outage. This provides the user with information that supports planning of strategies on how to cope with impending failures and how to prioritize repair work.

The display is interactive in that any of the sub-components 35 may be selected to access lower-tier supporting information pages. This is accomplished by simply designating the sub-component of interest by selecting it via the Operator Input Device (OID) 11 and activating the selection. For example, using a mouse as the OID 11, the user would first maneuver the mouse to place the cursor on the desired sub-component and would activate the selection using a "mouse click" button.

Figure 6:
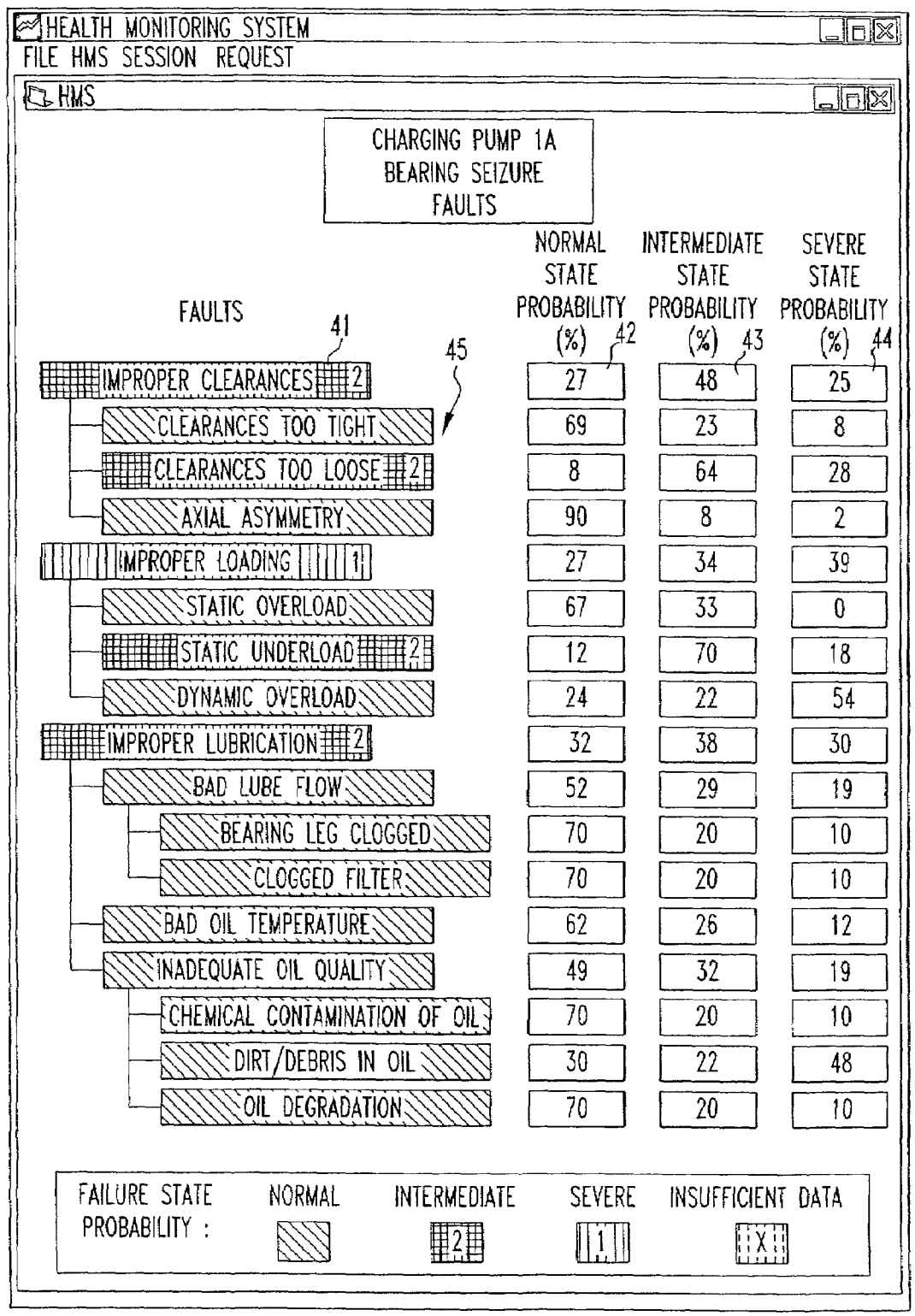
FIG. 6 is an illustration of an example of a second tier display page presenting faults for a particular failure mode selected from FIG. 4.

For each sub-component, there are multiple ways in which the sub-component could fail. Each of these failures is designated as a "fault" 41. The Tier-2 display page 18 depicts the fault status for each of the sub-components 35 that are associated with a plant system, plant component, or specific piece of plant equipment 33. FIG. 6 illustrates a typical Tier-2 Fault Display page 18. The display indicates the probability of failure for each of the faults as determined by the Health Monitoring Status Module 6 by presenting a normal state probability 42, an intermediate state probability 43 and a severe state probability 44. The faults are presented in a hierarchy 45.

Figure 7:
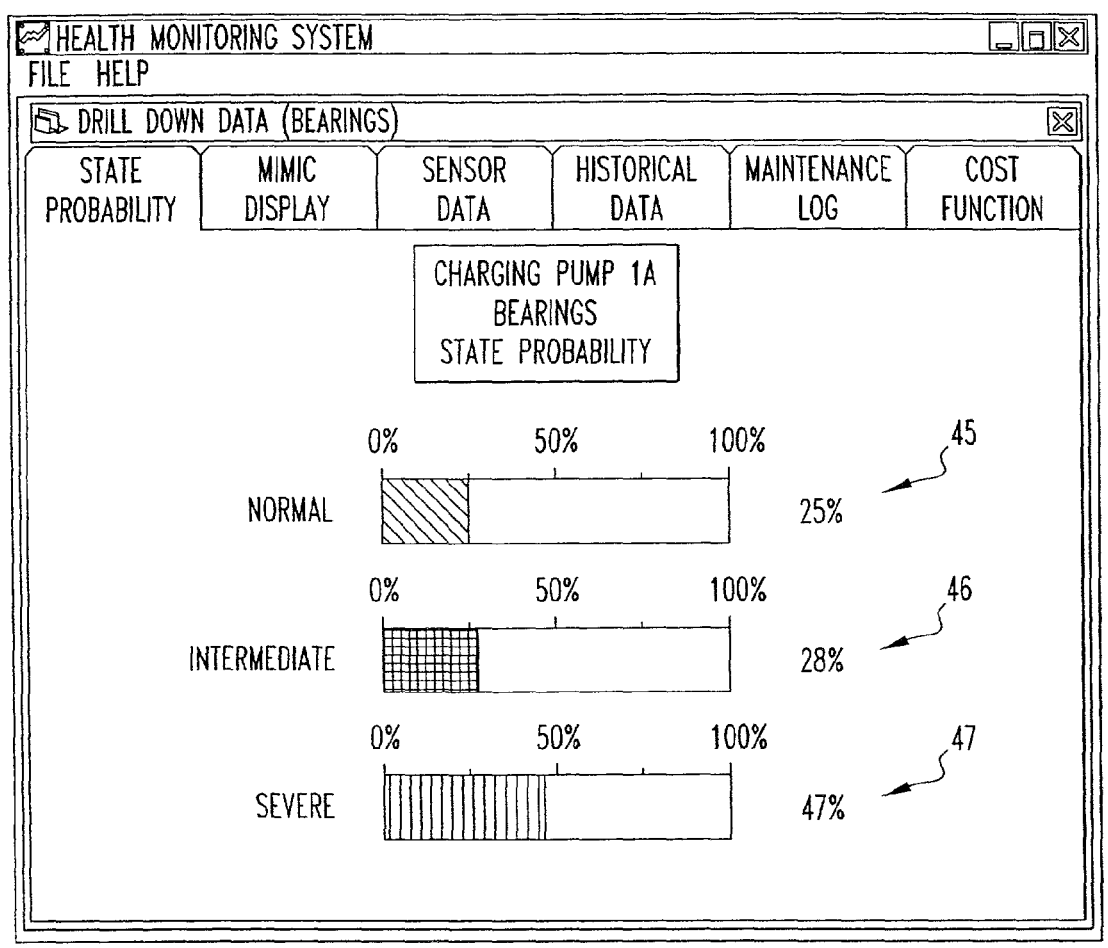
FIG. 7 is an illustration of an example of a third tier state probability display page.

A number of Tier-3 display pages 19a–19f (Drill Down Displays) provide supporting information to the user. Each page supplies detailed low-level data which is used for analysis, diagnostics and repair planning purposes. Each display on Tier three can be rapidly accessed via use of the Tab Index which is located on the top of each Tier-three page as illustrated in FIG. 7 where the "state probability" has been selected.

Maneuvering through Tier-three pages is achieved via the "Tab Index" access mechanism. This allows all of the lower level displays to be quickly accessed via "horizontal" maneuvering, in an intuitive manner.

There are six typical types of Tier-three display pages as follows:

1. Health Monitoring Status Details Page 19a—This page displays specific details relative to the Health Monitoring Status Module algorithmic outputs to support analysis of the failure prediction logic. An example of this type of page is illustrated in FIG. 7, for the case in which Bayesian Belief Networks are the basis of the failure prediction logic within the Health Monitoring Status Module 6. Other failure prediction methodologies would result in outputs unique to those methodologies. The example of FIG. 7 illustrates the normal 45, intermediate 46, and severe 47 state probabilities for the bearings sub-component.

Figure 8:
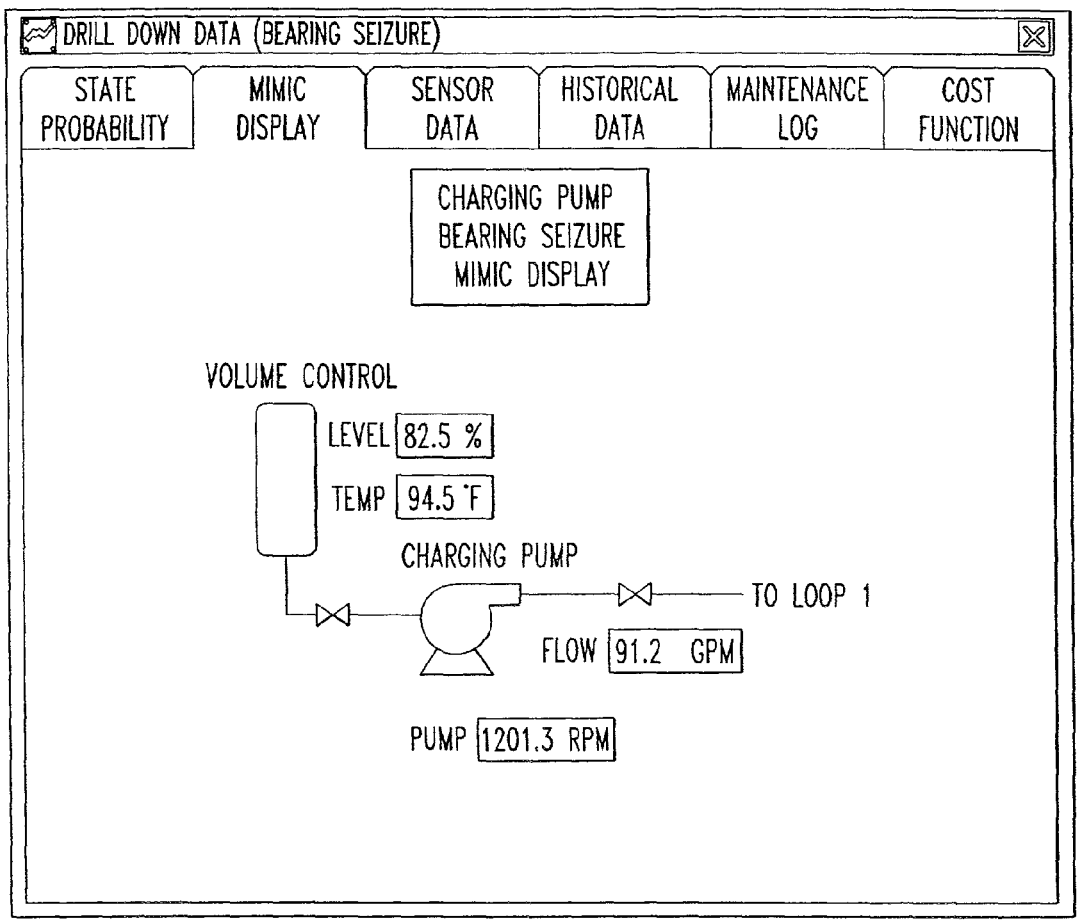
FIG. 8 is an illustration of an example of a third tier mimic display page.

2. Mimic Display Page 19b—This page displays a mimic representation of the component or system. Sensor values are also included on the mimic, as appropriate. FIG. 8 illustrates a typical Tier-3 mimic display.

Figure 9:
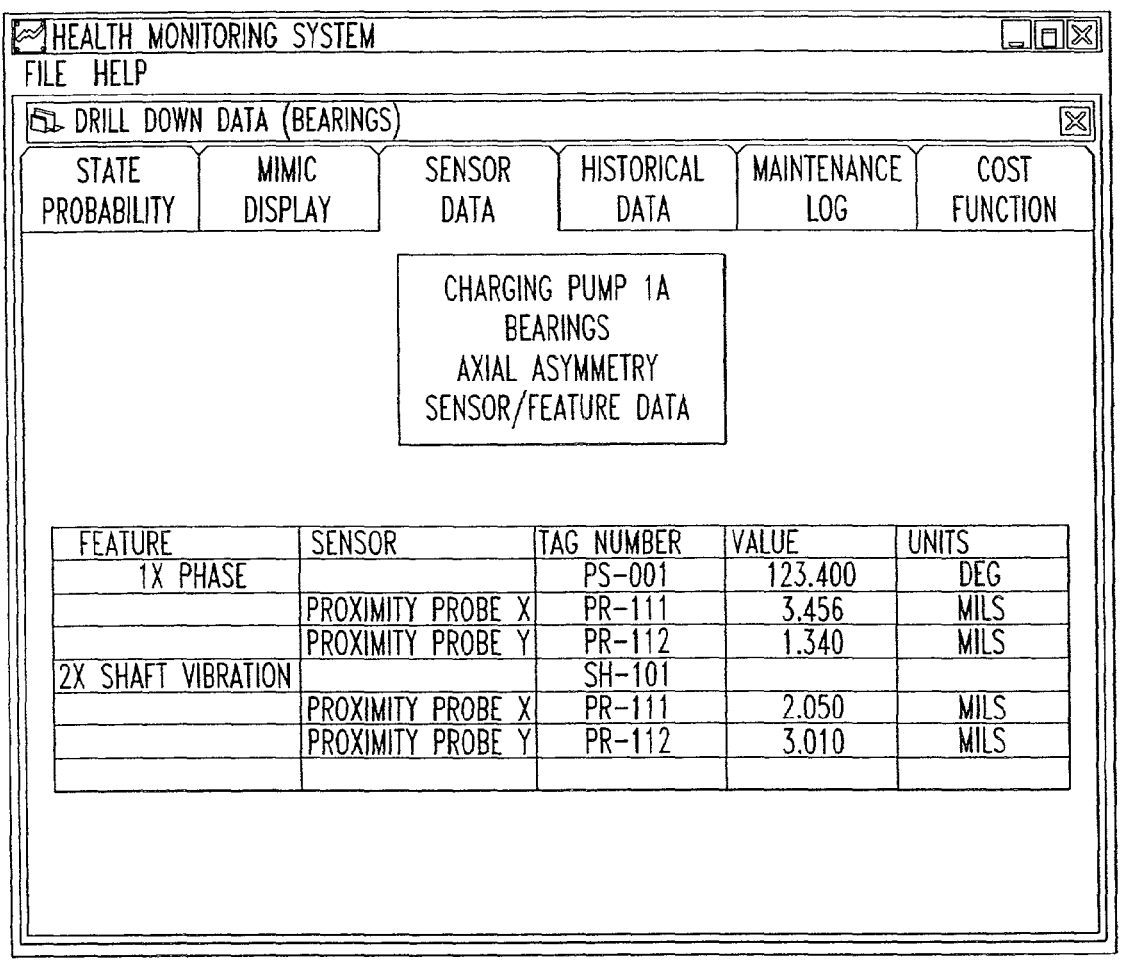
FIG. 9 is an illustration of a third tier display page showing an example of a feature/sensor data page.

3. Sensor Features Display Page 19c—This page displays the sensor data associated with the component or system. FIG. 9 illustrates a typical Tier 3 Sensor Features display.

Figure 10:
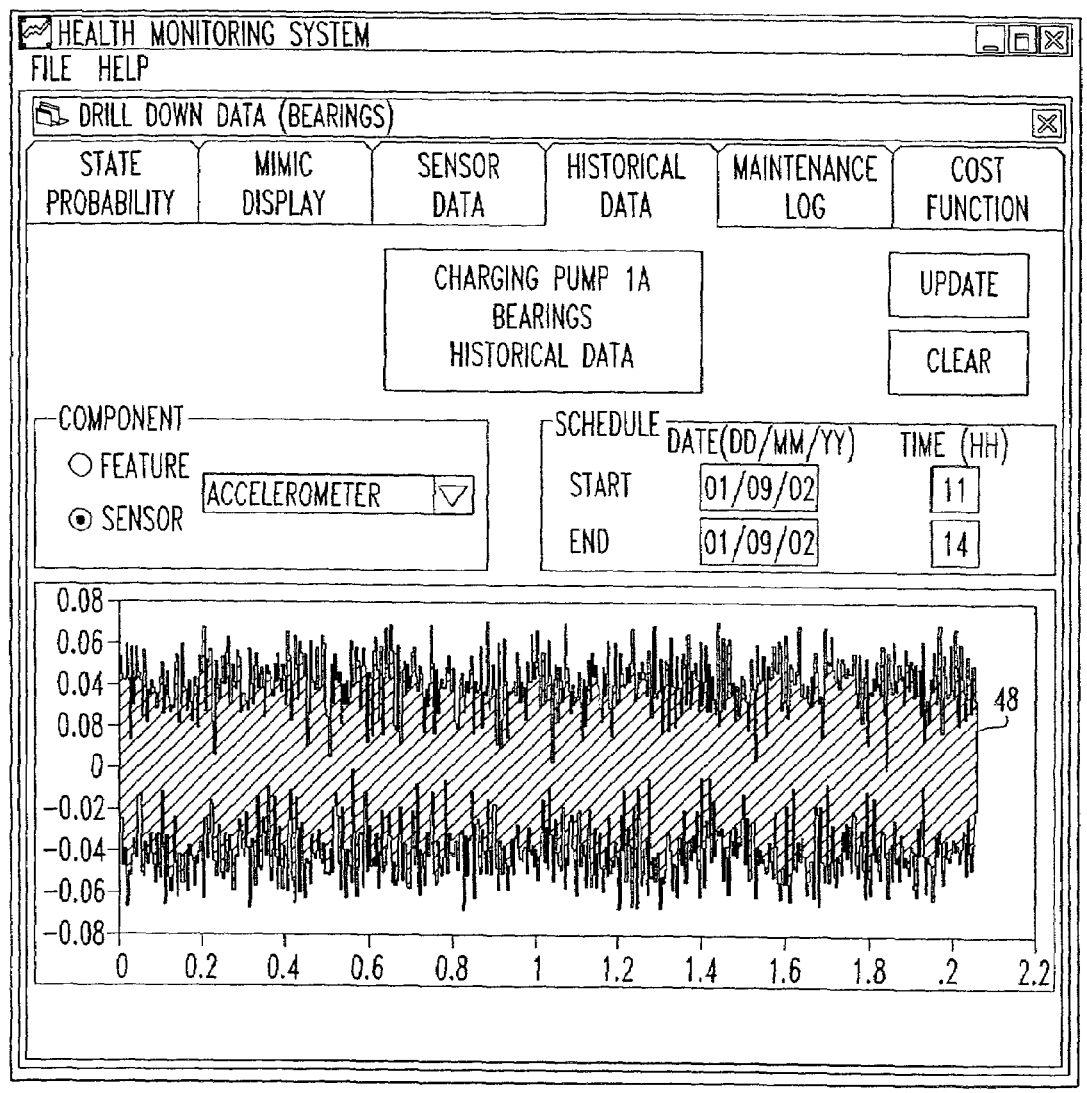
FIG. 10 is an illustration of an example of third tier historical data display page.

4. Historical Data Display Page 19d—This page displays historical sensor data associated with a selected component or system parameter. FIG. 10 illustrates a typical Tier-3 Historical Data display 48.

5. Maintenance Log Display Page 19e—This page displays maintenance data associated with a selected component or system. Maintenance activities previously performed may be viewed as well as schedule future maintenance periods. FIG. 11 illustrates a typical Tier-3 Maintenance Log display.

Figure 12:
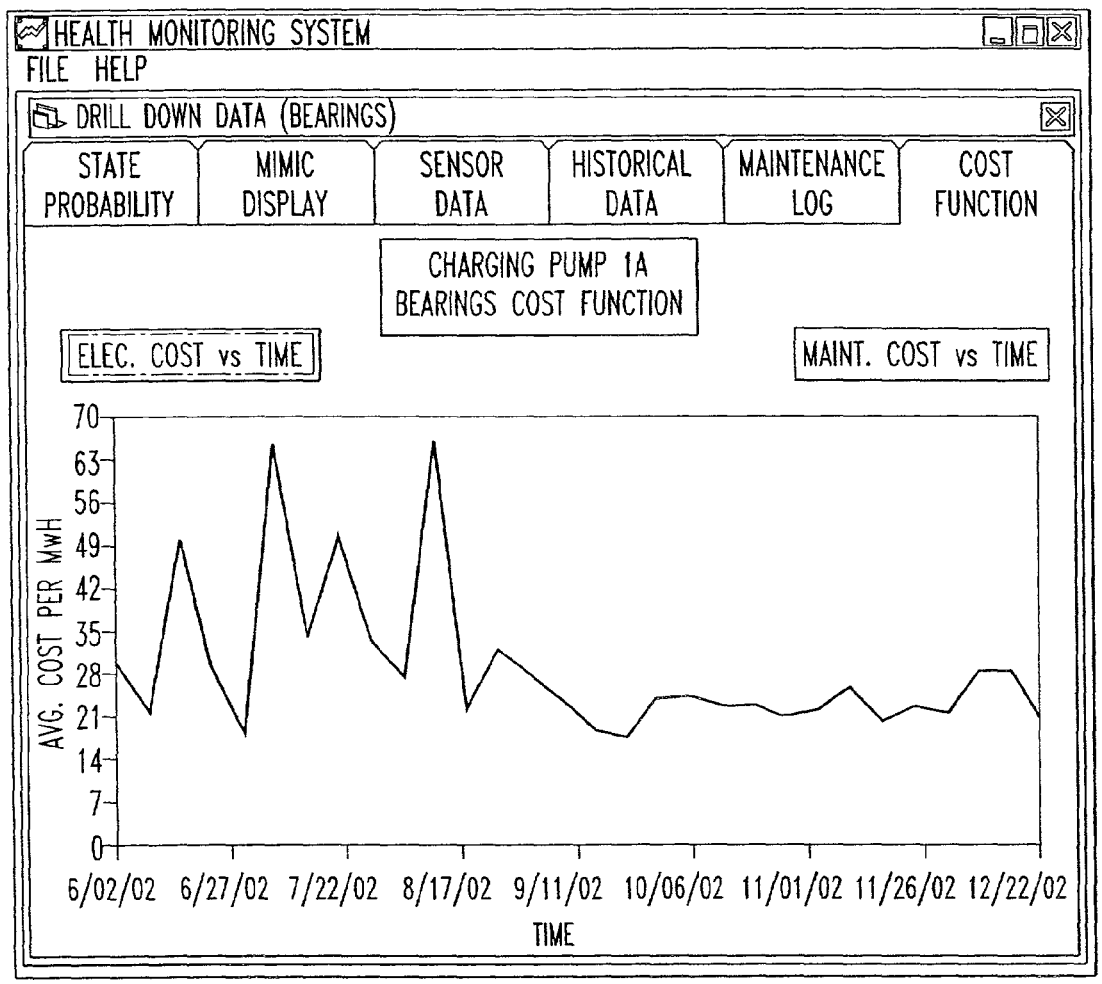
FIG. 12 is an illustration of an example of a third tier cost function display page presenting the electricity cost per hour.
Figure 13:
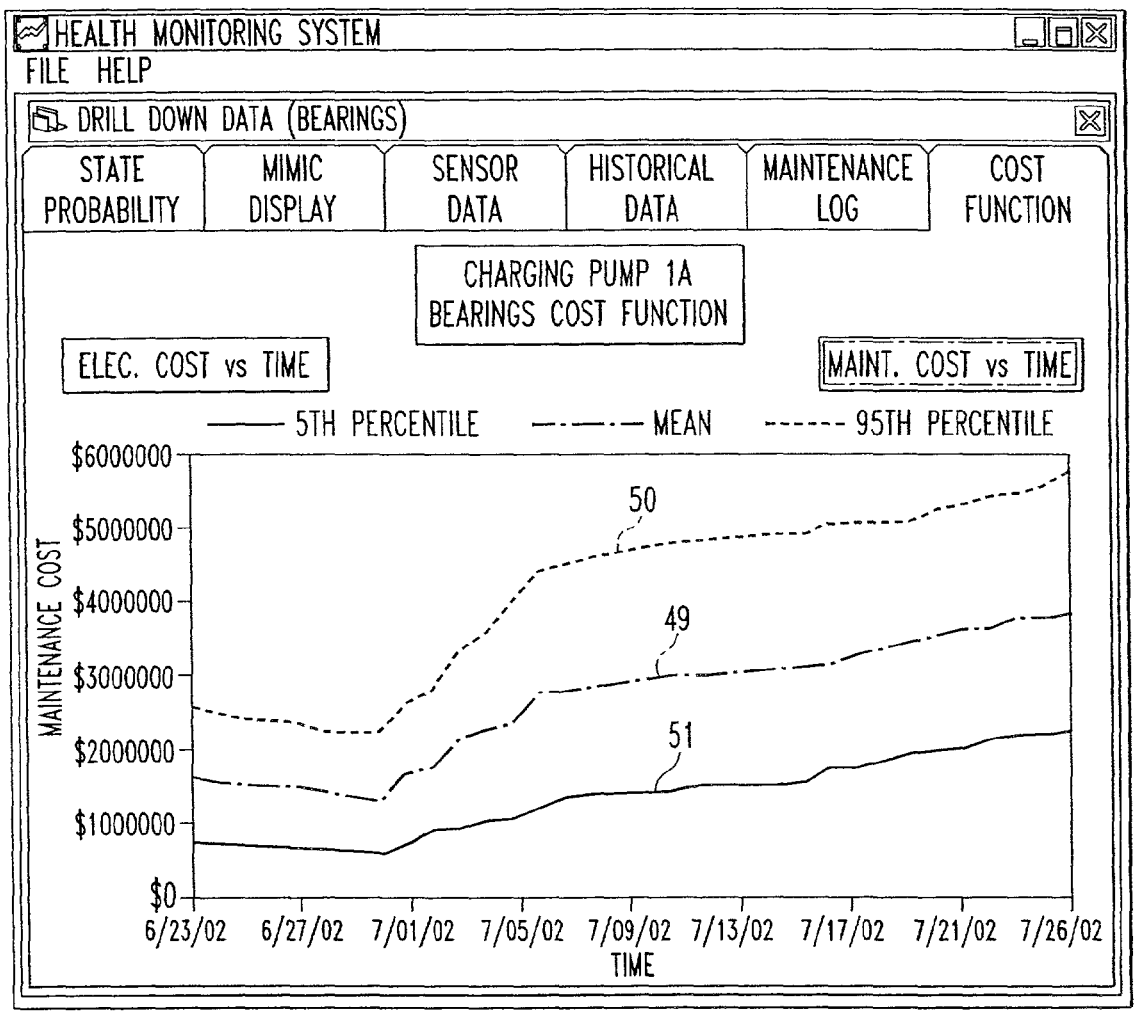
FIG. 13 is an illustration of an example of a third tier cost function showing an example of cost as a function of the time of repair.

6. Cost Function Display Pages $19f_{(1,2)}$—These pages display the outputs from the cost function calculator (contained within the Maintenance Log and Scheduler Module 8) that computes dollar costs associated with a repair. FIG. 12 illustrates a typical Tier-3 Cost Function display $19f_1$, that plots the cost of electricity as a function of time. This information is useful in scheduling down time for a repair. FIG. 13 illustrates another typical Tier-3 Cost Function display that shows the repair cost as a function of when the repair is scheduled. The traces 49, 50 and 51 represent the mean, 95 percentile and 5 percentile costs, respectively. Other cost functions could be presented in addition to or in place of those illustrated in the examples of FIGS. 12 and 13.

Unique features of the Health Monitoring Display system of the invention include:

Use of color-coded failure domains allows rapid and intuitive recognition of component failure status by the operator, via visual clueing.

Use of alpha-numeric coding for failure domains provides a second independent coding mechanism that supports users who are challenged relative to color discrimination.

Implementation of a "Green Board" concept for the Tier-one display allows the enterprise level (plant-wide) health status to be immediately ascertained.

Implementation of sub-component (Tier 1) display pages that depict the sub-components that are associated with each plant component, plant system, or specific piece of plant equipment, in the expected time-sequence order in which they are predicted fail along with the down (repair) time for each sub-component.

Implementation of fault (Tier 2) display pages that depict the explicit faults (failure mechanisms) associated with each sub-component.

Detailed component health-related data for a component that is predicted to fail is provided by the Tier-3 detailed support page. Each page supplies detailed low-level data that is used for health state analysis, diagnostics and for repair planning purposes.

Maneuvering through Tier-3 detailed health-related pages is achieved via a "Tab Index" access mechanism. This allows all of the lower level health-related displays to be quickly accessed via "horizontal" maneuvering, in an intuitive manner.

Use of a multi-tier display hierarchy allow the health monitoring information to be integrated and organized in a manner that supports a logical "top down" information structured from the high-level failure status overview of plant components (Apex), to the sub-component health status (Tier-1), to specific information relative to sub-component faults (Tier-2), to detailed low level data (Tier-3) which is used for health analysis, diagnostics and repair planning purposes.

A cost function calculator (contained within the Maintenance Log and Scheduler Module 8) computes the dollar cost associated with maintenance repair scheduling.

A program structure that contains the health monitoring display page formats within the local display data base (as opposed to hard-coded displays), and in which the application software references the database format entries; so that subsequent additions, deletions, and modifications of the display format can be readily made via database entries, without requiring changes to the application program code and/or to hard-coded display formats. This approach simplifies subsequent software maintenance since all changes can be made as database revisions.

Explanation of how the unique features provide advantages over the existing technology.

The display system presents failure prediction information at the enterprise level, using a single display page, so that the overall plant-wide equipment health status can be readily ascertained without the need to search through multiple display pages to derive overall plant-wide health state.

The format and design of the overall health status summary page (Apex display) allows the enterprise level health status to be quickly ascertained, in an unambiguous manner, via use of color-coded "failure domains". Current technology is not optimized for displaying overall enterprise-level health status.

The overall health status summary page (Apex display) also incorporates a redundant alpha-numeric coding scheme for the failure domains that supports users who are challenged relative to color discrimination.

Projections of the failure of sub-components that are associated with each plant component, plant system, or specific piece of plant equipment are presented on the Tier 1 display pages. These pages provide explicit details on the sub-component health state and the projected time to failure. Current technology is fragmented on the identification and display of the sub-component health state and projected time to failure for sub-components. By identifying the projected sub-component failures, the user, is provided with useful information that supports advanced planning of maintenance strategies to cope with the impending failures and for maintenance scheduling purposes.

Individual failure mechanisms (faults) for each sub-component are identified in the Tier 2 displays. This allows a better understanding of the failure process so that corrective actions can be taken to avoid, or minimize, the subsequent reoccurrence of similar failures.

By providing the enterprise level health status information within a single overview page, the operations staff is provided with a global view of the plant-wide health state and is better able to determine what equipment or systems are likely to experience failures within the near future and plan appropriate corrective or compensating actions to be implemented in order to mitigate the consequences of the expected failures. Current technology does not adequately integrate enterprise level health monitoring data.

By providing the enterprise level health status information within a single overview page, the operations staff is better able to plan the execution of future plant evolutions by considering the probability of failure of critical or required equipment or systems occurring during the planned evolution period. Current technology does not adequately integrate enterprise level health monitoring data.

The multi tier display hierarchy organizes the information in a manner that supports a logical "top down" information structure from the high-level failure status overview of plant components (Apex), to the sub-component health status (Tier 1), to specific information relative to sub-component faults (Tier 2), to detailed low-level data (Tier-3) which is used for health analysis, diagnostics and repair planning purposes. Current technology does not provide an integrated hierarchical structure with rapid access to various levels of health related information.

A cost function calculator (contained within the Maintenance Log and Scheduler Module 8) computes the dollar cost associated with various maintenance repair scheduling. This information provided by this calculator is used to provide supporting information to assist the operations staff in planning repair or replacement strategies for a component that is predicted to fail by indicating the financial cost associated with maintenance strategy and maintenance scheduling. Current technology does not integrate cost functions within the health monitoring application.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A health monitoring display system for a complex plant, the system comprising:

sensors generating sensed values of specified parameters of a plurality of components in the complex plant;

a health monitoring status means determining from the sensed values a health condition for the plurality of components the complex plant; and a human machine interface including a display means presenting in a single page enterprise level display the health condition as determined by the health monitoring status means of each of selected of the plurality of components of the complex plant chosen to provide an indication of enterprise-wide health of the complex plant.

2. The system of claim 1, wherein the human machine interface includes an operator input device and the display means comprises means displaying multiple tiers of information relevant to the health of a selected component of the complex plant selected through the operator input device beginning from the single page enterprise level display.

3. The system of claim 2, wherein the display means comprises means displaying information on sub-components of a selected component of the complex plant in a first tier display.

4. The system of claim 3, wherein the display means displays in the first tier display a predicted time to failure for each sub-component.

5. The system of claim 4, wherein the display device further includes means displaying an expected down time for each sub-component.

6. The system of claim 4, wherein the display means comprises means displaying for each predicted time to failure, an expected time to failure, an upper bound of the time to failure, and a lower bound for the predicted time to failure.

7. The system of claim 4, wherein the display means comprises means also displaying a time to scheduled outage.

8. The system of claim 4, wherein the display means presents the sub-components on the display in the time-sequence order that they are predicted to fail.

9. The system of claim 3, wherein the display means comprises means displaying in a second tier display faults for a sub-component selected through the operator input device from the first tier display.

10. The system of claim 9, wherein the display means comprises means presenting a failure state probability for each fault in the second tier display.

11. The system of claim 9, wherein display means comprises means displaying the faults in a hierarchy.

12. The system of claim 11, wherein the display means comprises means displaying a failure state probability for each fault.

13. The system of claim 11, wherein the display means includes means displaying a normal failure state probability, an intermediate failure state probability, and a severe failure state probability for each fault.

14. The system of claim 9, wherein the display means comprises means displaying in a third tier display any one of multiple displays with selected details on the sub-component selected from the first tier display.

15. The system of claim 14, wherein the display means comprises means presenting for the third tier display at least one detail selected from a group comprising: failure state probability of the selected sub-component, a mimic display, sensor data, historical data, a maintenance log, and a cost function.

16. The system of claim 15, wherein the display means presents as the state probability, a probability of a normal state, a probability of an intermediate state, and a probability of a severe state for the selected sub-component.

17. The system of claim 16, wherein the display means comprises means for displaying a graphical representation of historical data.

18. The system of claim 15, wherein the display means comprises means generating a display presenting the cost to be expected from failure of the selected sub-component.

19. The system of claim 18, wherein the display means comprises means presenting the cost function as a graphical representation of cost to be expected from the selected mode failure as a function of time that repair is made.

20. The system of claim 19, wherein the display means comprises means displaying a graphical representation of a median cost, a selected upper percentile cost, and a lower percentile cost to be expected from the selected failure mode as a function of time that the repair is made.

21. The system of claim 18, wherein the display means includes means displaying as a cost function, a cost of operating the complex plant as a function of time over an extended period.

22. The system of claim 1, wherein the display means presents the single page enterprise level display using a common hierarchy of failure domains in representing the health condition of each of the selected of the plurality of components of the complex plant.

23. The system of claim 22, wherein the display means uses a common hierarchy of failure domains comprising representations indicating an imminent probability of failure, a low probability of failure and an intermediate probability of failure.

24. The system of claim 2, wherein the display means uses a common hierarchy of failure domains in representing the health conditions in the single page enterprise level display and in each of the multiple tiers.

* * * * *

UNITED STATES PATENT AND TRADEMARK OFFICE
CERTIFICATE OF CORRECTION

| | |
|---|---|
| PATENT NO. | : 7,088,255 B2 |
| APPLICATION NO. | : 10/157280 |
| DATED | : August 8, 2006 |
| INVENTOR(S) | : Charles F. Ridolfo, Daryl L. Harmon and Dreyfuss Colin |

It is certified that error appears in the above-identified patent and that said Letters Patent is hereby corrected as shown below:

Column 1, after the Title and before the Cross Reference To Related Application paragraphs, insert: --

GOVERNMENT RIGHTS

This invention was made with Government support under Contract No. DE-FC03-99SF21910 awarded by the United States Department of Energy. The Government has certain rights in this invention. --

Signed and Sealed this

Fifth Day of December, 2006

JON W. DUDAS
*Director of the United States Patent and Trademark Office*